Aug. 5, 1958  R. B. BASHAM  2,846,641
SERVOMOTOR POSITIONING DEVICE
Filed Jan. 23, 1957
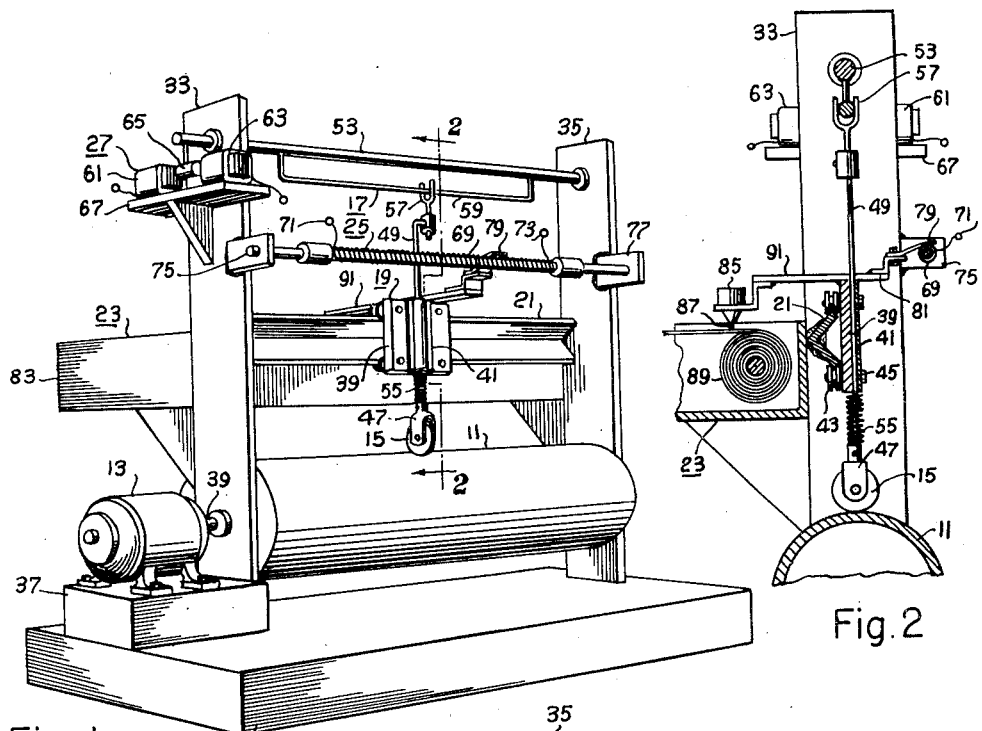
Fig. 1
Fig. 2
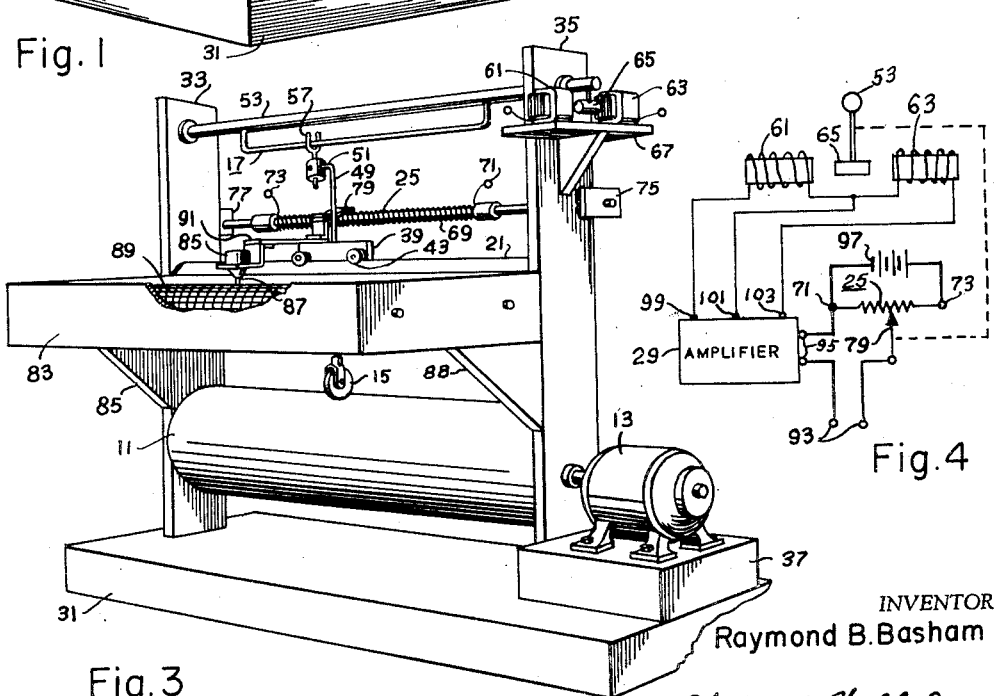
Fig. 3
Fig. 4
INVENTOR
Raymond B. Basham
BY Wm. T. Hofford
ATTORNEY

United States Patent Office 2,846,641
Patented Aug. 5, 1958

2,846,641
SERVOMOTOR POSITIONING DEVICE

Raymond B. Basham, Fort Worth, Tex., assignor to Westronics, Inc., Fort Worth, Tex.

Application January 23, 1957, Serial No. 635,857

8 Claims. (Cl. 323—66)

My invention relates to devices and systems wherein an element is continuously positioned in accordance with signals supplied to the system input.

There are numerous instances in diverse industrial activities wherein there is a need for a continuous indication or record of the behavior, condition, performance, or characteristics of industrial apparatus or of material being processed or tested. To provide such indication or record, it is common practice to derive electrical signals which at all times are representative of the behavior of the apparatus or material to be observed, and then to utilize such derived signals in a servo type, null, self-balancing positioning system, with the system output driving the indicator or the recorder. Such systems in accordance with the prior art of which I am aware are all unstable and unreliable in the region of the null condition, which is in fact precisely the region where positive action and reliability are most needed. For example, one servo type system commonly used in the past includes a reversible motor driven by an amplifier which is excited by an error signal resulting from the difference between an input signal level and the voltage developed by the feed-back loop. This system is inherently defective because the error signal diminishes as the system approaches the null, or balanced condition, and the amplifier output diminishes proportionately, with the result that the motor lacks sufficient torque to reach a true null condition. Thus, there is an undesirable dead zone, or zone of inaccuracy, in the region of the null condition. The motor in fact is not capable of producing sufficient reverse torque for proper braking action when it runs past the null point, resulting in a strong tendency to hunt. Damping may be introduced to reduce the hunting tendency but this slows down the system response, and seriously limits recording speed capabilities.

Accordingly, an important object of my invention is to provide a servo type, null, self-balancing system which obviates the disadvantages abovementioned.

Another object of my invention is to provide an improved positioning system for producing an accurate indication or record of the behavior, condition, performance, or characteristics of industrial apparatus, or of material being processed or tested.

Another object of my invention is to provide an improved servo type, null, self-balancing positioning system wherein there is no dead zone in the region of the null condition.

Another object of my invention is to provide an improved servo type, null, self-balancing positioning system wherein the positioning action in the region of the null condition is positive.

Another object of my invention is to provide an improved servo type, null, self-balancing positioning system wherein the magnitude of available positioning force increases as the null condition is approached.

Another object of my invention is to provide an improved servo type, null, self-balancing positioning system including a mechanical amplifier the available output of which increases as the null condition is approached.

Another object of my invention is to provide an improved combination mechanical amplifier and positioning device.

These and other objects are effected by my invention as will be apparent from the following description taken in accordance with the accompanying drawing, forming a part of this application, in which:

Fig. 1 is a schematic perspective front view of a positioning system in accordance with a preferred embodiment of my invention;

Fig. 2 is a section view taken on lines 2—2 of Fig. 1;

Fig. 3 is a schematic perspective rear view of the system of Fig. 1; and

Fig. 4 is a schematic electric circuit diagram for the system of Fig. 1.

In the drawings, the primary components shown are a drum 11, an electric motor 13, a friction wheel 15, friction wheel steering assembly 17, reciprocative carriage assembly 19, carriage support guide member 21, recorder 23, potentiometer 25, electromagnet assembly 27, electronic amplifier 29, main base member 31, and upright support members 33, 35. The spaced parallel upstanding support members 33, 35 are fixed to the main base member 31. The drum 11 has a cylindrical surface and is journaled to and extends between the upstanding support members 33, 35 parallel to the main base member 31. The electric motor 13 is mounted on a motor base member 37 with the axis of its output shaft 39 aligned with the drum axis. The motor output shaft 39 is coupled in driving relation to the drum 11. The carriage support guide member 21 is an angle bar disposed between said upright support members 33, 35 parallel to the axis of the drum 11 and is fixed at its ends to said support members. The outer edges of said guide member, or angle bar 21 lie in a plane parallel to the longitudinal axes of said support members. The carriage assembly 19 comprises a carriage block 39, a bearing plate 41, carriage rollers 43, and carriage roller shafts 45. The carriage block 39 is of rectangular shape, and has a centrally disposed bearing groove in one face running in the direction transverse of the angle bar 21. The carriage roller shafts 45 are fixed to the carriage block 39 in upper and lower pairs with the axes of each pair lying in a respective plane parallel to the angle bar 21. The carriage rollers 43 have grooved peripheral surfaces to hold them in effective rolling contact with said angle bar 21. The bearing plate 41 is fixed to the grooved face of said block 39 and carries a bearing groove complementing the one in the block. The friction wheel steering assembly 17 comprises a fork 47, a steering rod 49, a crank 51, and an actuating bar 53. The friction wheel 15 is supported by the fork 47 which is fixed to one end of the steering rod 49 which is in turn journaled in the bearing formed by the block and bearing plate grooves. The friction wheel 15 is biased into contact with the drum 11 by a compression spring 55 bearing at one end on the fork 47 and at the other end on the block 39 and bearing plate 41. The crank 51 has a bifurcated end portion 57 and is fixed to the other end of the steering rod 49 above the carriage block 39. The actuating bar 53 is disposed parallel to the angle bar 21 and is journaled on the parallel spaced support members 33, 35 with one end extending beyond the left hand support member 33 (as seen in Fig. 1). The actuating bar 53 carries a depending longitudinally extending toggle member 59 which is engaged by the bifurcated end portion 57 of the crank 51 and remains so engaged for all carriage positions. The electromagnet assembly 27 comprises a pair of spaced coils 61, 63 and an armature 65. The electromagnet coils 61, 63 are mounted on a bracket 67 which is fixed to the outer face of the left hand parallel spaced support member 33 (as seen in Fig. 1). The armature 65 is fixed in pendulum fashion to the end of the actuator bar 53 which extends out over the bracket 67. The armature 65 is thus suspended between the coils 61, 63 in a position to be swung by magnetic force in either direction, causing oscillatory movement of the actuator bar 53. The potentiometer fixed resistance 69 having end terminals 71, 73, is distributed along the length of an insulating core over the entire range of carriage travel. The potentiometer core is disposed parallel to the angle bar 21 slightly above and forward of same (as seen in Fig. 1) and is supported at its ends on brackets 75, 77 which are in turn fixed to respective parallel spaced support members 33, 35. The potentiometer's sliding contact 79 is fixed to and insulated from a support bracket 81 which is in turn fixed to the top of the carriage block 37. The recorder comprises a housing 83, conventional paper handling mechanism (not shown), an ink reservoir 85, and an inking pen 87. The recorder housing 83 is mounted on support brackets 85, 87 fixed to the rear faces (as seen in Fig. 1), of the parallel spaced support members 35, 33, so that the top of the housing lies in a horizontal plane at about the level of the angle bar 21. The ink reservoir 85 is held in position above the record paper 89 by a bracket 91 which is fixed to the top of the carriage block 39. The inking pen 87 is carried at the lower end of the reservoir 85 in contact with the record paper 89. The record paper is moved at a selectable predetermined rate by conventional recorder mechanism (not shown).

The electrical circuit for the system is shown by Fig. 4. The system input terminals 93 are connected in series with the potentiometer sliding contact 79 and one potentiometer resistance end terminal 71, and the input terminals 95 of the electronic amplifier 29. A source of direct current voltage shown as a battery 97 is connected in series with the potentiometer resistance end terminals 71, 73. The electronic amplifier 29 is of a conventional direct current type having two outputs, the first of which appears between a first output terminal 99 and a common terminal 101, and the second of which appears between a second output terminal 103 and the common terminal 101. The amplifier 29 is designed to have balanced outputs for zero input, and unbalanced outputs for inputs of other than zero. When the input is negative, the outputs are unbalanced in one direction and when the input is positive, the outputs are unbalanced in the other direction. The magnitudes of the outputs are proportional to the magnitude of the input. One coil 61 of the electromagnet 27 is connected between the first amplifier output terminal 99 and the common terminal 101, while the other coil 63 of the electromagnet 27 is connected between the second amplifier output terminal 103 and the common terminal 101. The potentiometer slider 79 is electromechanically linked to the electromagnet armature 65, which fact is indicated by the dotted line in Fig. 4.

In operation, direct current signals representative of the condition to be recorded are introduced at the system input terminals 93. The system has of course been preadjusted so that the recorder pen 87 is at the proper position for a given system input signal level. The system input signal is added algebraically to the potentiometer output voltage and the resultant, which may be termed the error signal, appears at the amplifier input terminals. When the error signal is zero, the amplifier output is balanced and the electromagnet armature 65 is held in the neutral position halfway between the coils 61, 63. The steering mechanism is arranged so that when the armature 65 is in neutral position, the friction wheel 15 takes a position such that its axis of rotation is parallel to the axis of rotation of the drum 11, the latter being driven at constant speed by the electric motor 13. Under these conditions, the friction wheel 15 makes a closed track on the drum 11, and the carriage 19 does not move, so the recorder pen 87 makes a straight line on the recorder paper 89. Now assume that the condition to be recorded changes in one direction, resulting in a change in system input voltage, causing a positive error signal to appear at the amplifier input terminals 93. The positive error signal immediately causes the amplifier output to become unbalanced, causing the electromagnet armature to be attracted toward one coil. This moves the actuator bar 53 to cause the toggle 59 to move the crank 51 and turn the steering shaft 49 so that the axis of rotation of the friction wheel 15 is no longer parallel to the axis of drum rotation. The friction wheel 15 now makes a screw-thread like track on the drum surface, causing the carriage 19 to move. Movement of the carriage of course moves the potentiometer slider contact 79 over voltage divider 25, changing the potentiometer output voltage in a direction such as to diminish the magnitude of the error signal. As the error signal diminishes, the amplifier output approaches the balanced condition, causing the armature 65 to be moved toward its neutral position, actuating the steering mechanism to cause the axis of rotation of the friction wheel 15 to approach parallelism with the axis of drum rotation. When the error signal reaches zero magnitude the carriage 19 comes to rest at a new position representing a condition of balance and equality between the magnitude of the system input voltage and the potentiometer output voltage. If the system input voltage then becomes more positive, the sequence is repeated and the carriage 19 moves on in the same direction to a new balance, or null, position. If the system input voltage becomes less positive, the sequence is repeated and the carriage 19 moves in the opposite direction to a position corresponding to the new balance, or null condition. The inking pen 87 of course follows the carriage movements and thus makes a true and continuous record of the condition to be recorded. It should be noted that the screw-thread like track of the friction wheel on the drum during a given nulling, or balancing, action, has a continuously diminishing pitch, coarse at the starting end and getting finer as the null condition is approached. As the pitch of the wheel track diminishes, the force available for positioning the carriage actually increases. Thus, the positioning action in the region of the null condition is quite positive, and there is no dead zone. The bias pressure acting to hold the friction wheel in contact with the drum can of course be adjusted to provide adequate friction contact for optimum operation. It should also be noted that during a nulling operation, the carriage moves at first quickly and then with diminishing speed as the null condition is approached, which is a desirable attribute. Further, since there is no problem of hunting, and no necessity for damping, the system response can be fast, resulting in enhanced recording speed capability.

While I have shown my invention in only one form, it will be obvious to those skilled in the art that it is not so limited, but is susceptible of various changes and modifications without departing from the spirit thereof.

I claim:

1. A servo type, null, self-balancing positioning system comprising, a drum mounted for rotation about its central axis, means for rotating said drum at predetermined speed, a steerable friction wheel in rolling contact with said drum, a reciprocative carriage mechanically linked to said wheel, an element to be positioned fixed to said carriage, a potentiometer having a movable contact driven by said carriage, a steering mechanism for said friction wheel, electromagnetic means adapted for controlling said steering mechanism, an electronic amplifier having output terminals connected in circuit with said electromagnetic means and having input terminals connected in circuit with the output of said potentiometer and a source of system input signals.

2. A positioning system comprising, a drum mounted for rotation about its central axis, means for rotating said drum, a steerable friction wheel in rolling contact with said drum, a carriage movable responsive to lateral movement of said wheel, an element to be positioned controlled by movement of said carriage, a variable voltage source controlled by movement of said carriage, a steering mechanism for said friction wheel, electromagnetic means adapted for controlling said steering mechanism, and an electronic amplifier having output terminals connected in circuit with said electromagnetic means and having input terminals connected in circuit with the output of said variable voltage source and a source of system input signals.

3. A positioning device comprising a pair of parallel spaced support members, a drum disposed between and journaled on said members for rotation about an axis perpendicular to said members, a carriage guide member disposed between and fixed to said support members parallel to the axis of said drum, a carriage mounted to ride on said guide member, a friction wheel in rolling contact with said drum, wheel support means, a steering shaft extending perpendicular to the axis of said drum and journaled to said carriage and fixed at one end to said wheel support means, a crank at the other end of said steering shaft, an actuating bar extending between and journaled on said parallel spaced support members and parallel to the axis of said drum, toggle means fixed to said actuating bar and engaging said crank, and means for imparting oscillatory movement to said actuating bar to steer said wheel.

4. A positioning system comprising, a drum mounted for rotation about its central axis, means for rotating said drum, a steerable friction wheel in rolling contact with said drum, a carriage movable responsive to lateral movement of said wheel, an element to be positioned controlled by movement of said carriage, a variable voltage source controlled by movement of said carriage, a steering mechanism for said friction wheel, electromagnetic means adapted for controlling said steering mechanism, and an amplifier having output terminals connected in circuit with said electromagnetic means and having input terminals connected in circuit with the output of said variable voltage source and a source of system input signals.

5. A positioning system comprising, a drum mounted for rotation about its central axis, means for rotating said drum, a steerable friction wheel in rolling contact with said drum, a carriage movable responsive to lateral movement of said wheel, an element to be positioned controlled by movement of said carriage, a variable voltage source controlled by movement of said carriage, a steering mechanism for said friction wheel, electromagnetic means adapted for controlling said steering mechanism, electric circuit means having output terminals connected in circuit with said electromagnetic means and having input terminals connected in circuit with the output of said variable voltage source and a source of system input signals.

6. A positioning system comprising, a drum mounted for rotation about its central axis, a steerable friction roller in rolling contact with said drum, means for inducing rotary motion of said wheel and said drum, a steering mechanism for said friction roller, means for producing relative motion between said roller and said drum in the axial directions of said drum responsive to steering movements of said roller, an element to be positioned controlled by said relative movement, a variable voltage source controlled by said relative movement, electromagnetic means adapted for controlling said steering mechanism, and an electronic amplifier having output terminals connected in circuit with said electromagnetic means and having input terminals connected in circuit with the output of said variable voltage source and a source of system input signals.

7. A positioning system, comprising, a drum mounted for rotation about its central axis, a steerable friction roller in rolling contact with said drum, means for inducing rotary motion of said wheel and said drum, a steering mechanism for said friction roller, means for producing relative motion between said roller and said drum, in the axial directions of said drum responsive to steering movements of said roller, an element to be positioned controlled by said relative movement, a variable voltage source controlled by said relative movement, electromagnetic means adapted for controlling said steering mechanism, and an amplifier having output terminals connected in circuit with said electromagnetic means and having input terminals connected in circuit with the output of said variable voltage source and a source of system input signals.

8. A positioning system comprising, a drum mounted for rotation about its central axis, a steerable friction roller in rolling contact with said drum, means for inducing rotary motion of said wheel and said drum, a steering mechanism for said friction roller, means for producing relative motion between said roller and said drum in the axial directions of said drum responsive to steering movements of said roller, an element to be positioned controlled by said relative movement, a variable voltage source controlled by said relative movement, electromagnetic means adapted for controlling said steering mechanism, electric circuit means having output terminals connected in circuit with said electromagnetic means and having input terminals connected in circuit with the output of said variable voltage source and a source of system input signals.

References Cited in the file of this patent

UNITED STATES PATENTS

| | | |
|---|---|---|
| 2,382,105 | Sarver | Aug. 14, 1945 |
| 2,412,386 | Borell | Dec. 10, 1946 |
| 2,473,896 | Mikina | June 21, 1949 |